United States Patent
Buss et al.

[19]

[11] Patent Number: 5,828,290
[45] Date of Patent: Oct. 27, 1998

[54] MODULAR POSITION SENSOR

[75] Inventors: Gary L. Buss, Elkhart; James E. Haugh, Granger; Murray Kaijala, Elkhart; William G. Osmer, Granger; William W. Wheeler, Middlebury; John Zdanys, Jr., Elkhart, all of Ind.

[73] Assignee: CTS Corporation, Elkhart, Ind.

[21] Appl. No.: 916,545

[22] Filed: Aug. 22, 1997

[51] Int. Cl.⁶ .................................................. H01C 10/32
[52] U.S. Cl. ..................... 338/162; 338/220; 338/221; 123/399
[58] Field of Search .................................... 338/312, 125, 338/162, 220, 221; 73/118.1; 123/399

[56] References Cited

U.S. PATENT DOCUMENTS

| | | | |
|---|---|---|---|
| 3,643,198 | 2/1972 | Economu et al. | 338/162 |
| 4,334,352 | 6/1982 | VanBenthuysen | 29/620 |
| 4,430,634 | 2/1984 | Hufford et al. | 338/164 |
| 4,435,691 | 3/1984 | Ginn | 338/125 |
| 4,616,504 | 10/1986 | Overcash et al. | 73/118.1 |
| 4,688,420 | 8/1987 | Minagawa | 73/118.1 |
| 4,703,649 | 11/1987 | Eitoku et al. | 73/118.1 |
| 5,039,975 | 8/1991 | Ishihara | 338/312 |
| 5,133,321 | 7/1992 | Hering et al. | 123/399 |
| 5,321,980 | 6/1994 | Hering et al. | 73/118.1 |
| 5,385,068 | 1/1995 | White et al. | 74/512 |
| 5,415,144 | 5/1995 | Hardin et al. | 123/399 |
| 5,416,295 | 5/1995 | White et al. | 200/86.5 |

*Primary Examiner*—Teresa J. Walberg
*Assistant Examiner*—Jeffrey Pwu
*Attorney, Agent, or Firm*—Michael W. Starkweather

[57] ABSTRACT

A position sensor, in particular, a position sensor that has a modular design for easily coupling to another modular device, like a gas peddle of a vehicle. The sensor unit eliminates the use of permanently attached electrical leads or pins attached to, for example, the output pads on flexible films coupled to a rotor. In another embodiment, the sensor unit is separate from a connector unit so different connector units can each be coupled to a standard sensor unit, or the sensor unit can be coupled directly to another device, like a gas pedal, without the use of an intermediate connector unit.

22 Claims, 3 Drawing Sheets

MODULAR POSITION SENSOR

BACKGROUND OF THE INVENTION

1. Field of the Invention

This invention relates to position sensors. In particular, there is a position sensor that has a modular design for easily coupling to another modular device.

2. Description of the Related Art

Various devices and methods of dealing with the design of position sensors are legion. Examples of patents related to the present invention are as follows, and each patent is herein incorporated by reference for the supporting teachings:

U.S. Pat. No. 5,416,295 is a combined pedal force switch and position sensor.

U.S. Pat. No. 5,415,144 is a throttle position validation method and apparatus.

U.S. Pat. No. 5,385,068 is an electronic accelerator pedal assembly with pedal force sensor.

U.S. Pat. No. 5,321,980 is an integrated throttle position sensor with independent position validation sensor.

U.S. Pat. No. 5,133,321 is an integrated throttle control and idle validation sensor.

U.S. Pat. No. 5,039,975 is a resistor substrate for a variable resistor employed in a throttle sensor.

U.S. Pat. No. 4,703,649 is a throttle valve opening sensor.

U.S. Pat. No. 4,688,420 is a throttle valve position detecting device for a vehicle engine.

U.S. Pat. No. 4,616,504 is a throttle position sensor with a potentiometer module that fits into a connector casing.

U.S. Pat. No. 4,435,691 is a dual track resistor element having nonlinear output.

U.S. Pat. No. 4,334,352 is a method of making a variable resistance control.

U.S. Pat. No. 4,430,634 is a rotary potentiometer with molded terminal package.

The foregoing patents reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, the applicant's claimed invention.

3. Problem with the Related Art

There are several common problems occurring with the prior art. It can be more expensive, for example, to make all the variations of connecting the same sensor unit to different devices. In particular, a sensor unit may need a female connection, a male connection, a pig tail connection, or connections that are angled, etc. It is expensive to build a different assembly line for every type of connector that is integrally attached to the same sensor unit. It would be less expensive to have one assembly line to make all sensor units and test them, and have other standard assembly lines that produce the various types of connectors for mounting the sensor unit thereto. Therefore, there is a need for a modular sensor unit that can be attached to either a modular connector or another device, like a gas pedal.

An additional problem with the prior art is that it is more expensive to build sensor unit modules with metal leads or pins that are permanently attached to the signal traces or output pads that are usually located, for example, on flexible films. The elimination of the permanent metal leads or pins from a modular sensor could lower the cost of making the sensor units. Therefore, there is a need for a less expensive sensor unit that can eliminate the use of permanently attached electrical leads or pins attached to, for example, the output pads on flexible films.

The preferred embodiment of the invention is designed to solve the problems herein described and other problems not discussed, which are discoverable by a skilled artisan.

SUMMARY OF THE INVENTION

It is a feature of the invention to provide a position sensors. In particular, there is a position sensor that has a modular design for easily coupling to another modular device, like a gas pedal of a vehicle.

Yet, another feature of the invention is to provide a sensor unit that is separate from a connector unit. Wherein, different connector units can each be coupled to a standard sensor unit, or the sensor unit can be coupled directly to another device, like a gas pedal, without the use of an intermediate connector unit.

Still, other features of the invention are to provide a position sensor, comprising a separate sensor and connecter unit. Where the sensor unit, includes a housing, which has i) a top side having a hole located therein; ii) a bottom side having: 1) a pressure wall, located thereon and within the housing, having a first and second side, 2) a plurality of pin holes adjacent the first side and extending through the bottom side, 3) a film tab, located thereon next to the plurality of pin holes; iii) a housing wall positioned between the top and bottom sides. The sensor unit also includes a flexible film having output pads located thereon, and positioned within the housing so the pads are located between the first side and the pin holes, and a remainder of the flexible film positioned adjacently the housing wall located on the second side. Additionally, the sensor unit has a rotor, positioned to be exposed through the hole, having a connector for contacting the flexible film located there around. A pressure element, located in the sensor unit, is positioned between the first side and the flexible film, for pressing the flexible film away from the first side. The sensor unit does not have a permanent pin attachment to the pads. The connector unit, including both 1) a housing, having a bottom and side wall; and 2) a plurality of electrical connector pins, extending from the bottom wall. It is noted that the sensor unit is connected to the connector unit so 1) the housing side wall surrounds the sensor unit housing, and 2) the plurality of electrical connector pins fits into the plurality of pin holes, and 3) the output pads are matched to and pressed against the plurality of electrical connector pins.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

Figure 1:
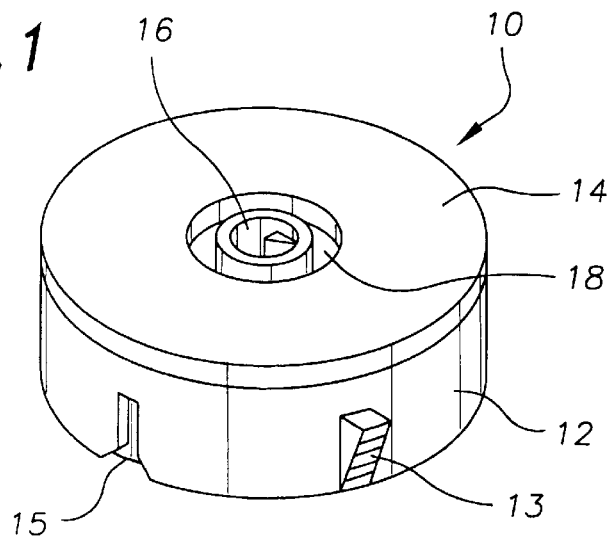
FIG. 1 is a perspective drawing of a modular sensor unit.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE PREFERRED EMBODIMENT

The present invention provides a position sensor. In particular, there is a position sensor that has a modular design for easily coupling to another modular device. Regarding FIG. 1, there is a preferred embodiment of the sensor unit 10. In particular, sensor unit 10 has a housing 12, a cover 14 forming a top side of the sensor unit 10, a rotor 16, a hole 18, an alignment notch 15, and snap tab 13.

Figure 2:
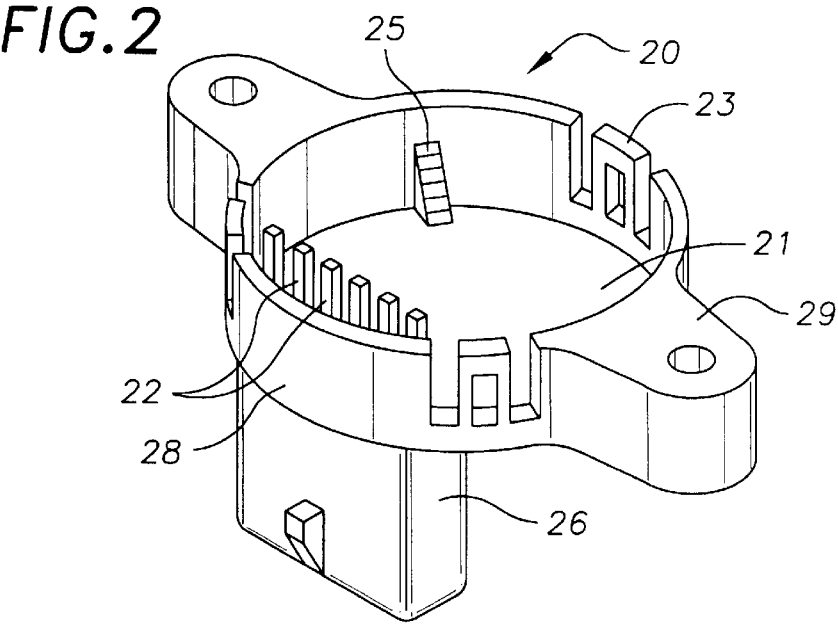
FIG. 2 is a perspective drawing of a combined connector and sensor unit of FIG. 1.

Referring to FIG. 2, there is illustrated a preferred embodiment for a connector 20. Uniquely, connector 20 includes a bottom wall 21, electrical connector pins 22, snap tab couplings 23, an alignment tab 25, an external wire electrical connector shroud 26, a connector housing wall 28, and mounting brackets 29.

Figure 3:
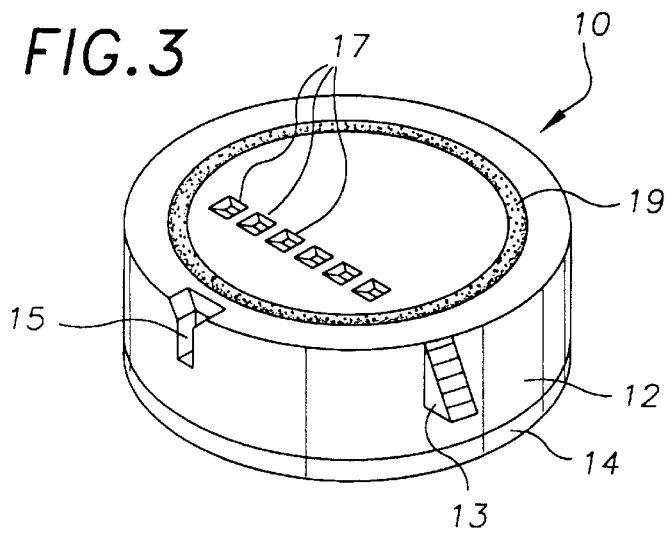
FIG. 3 is a perspective drawing of a bottom side of the sensor unit of FIG. 1.

Referring to FIG. 3, there is illustrated a bottom side of sensor unit 10. In particular, there is additionally illustrated an elastic seal 19, and pin alignment holes 17.

Figure 4:
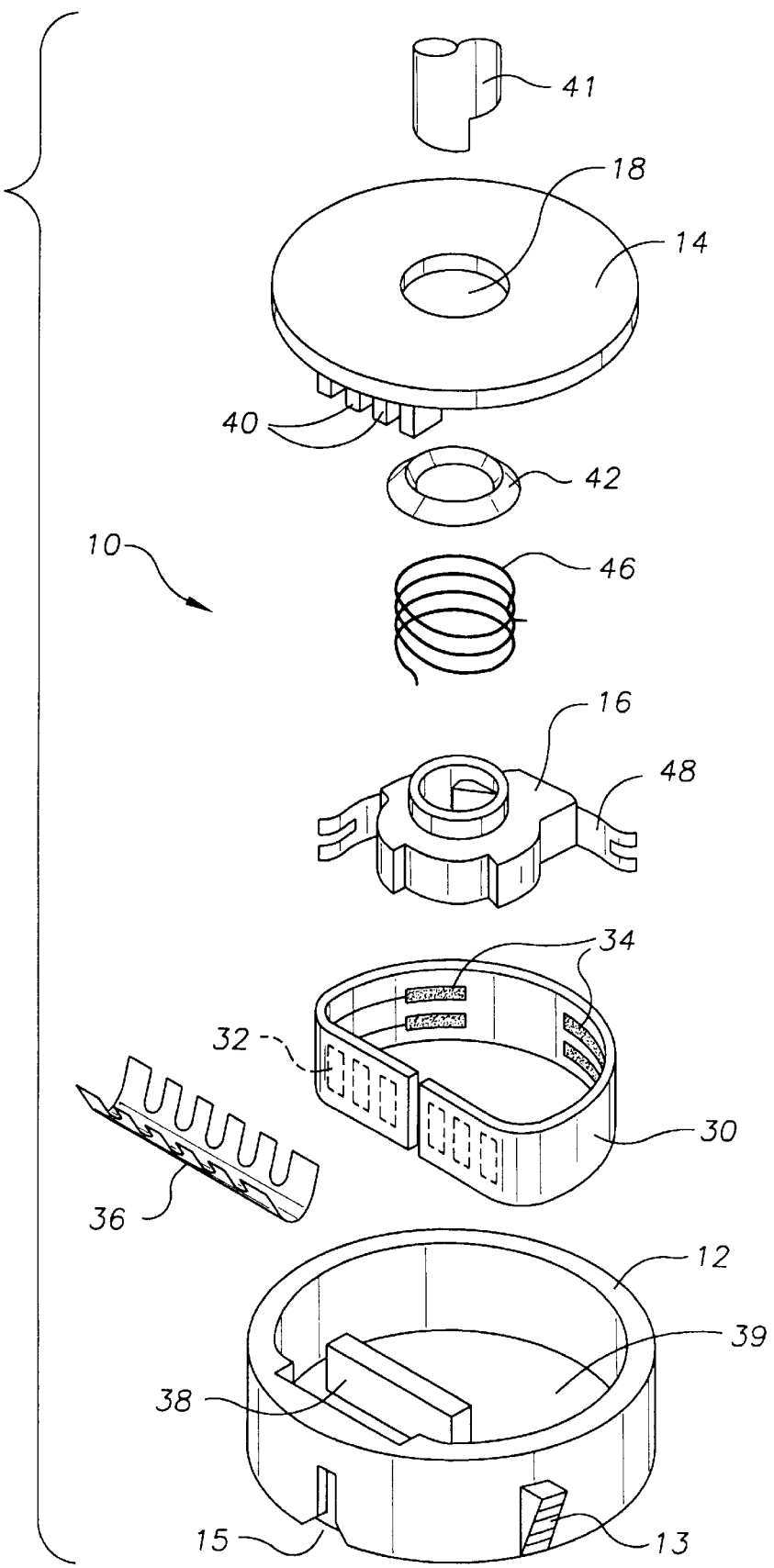
FIG. 4 is an exploded perspective view of the sensor unit of FIG. 1.

Referring to FIG. 4, there are illustrated major components of the sensor unit 10. Specifically, sensor unit 10 additionally comprises a seal 42, a spring 46, electrical contactor conductive wiper blades 48 on rotor 16, a flexible film 30, output pads 32, resistance elements and/or traces 34 that couple to pads 32, a pressure element 36, a pressure wall 38, and base 39 forming a bottom side of sensor unit 10. Additionally, there is illustrated a shaft 41 that is part of a device that is to have its position determined by the sensor. The shaft 41 is shaped to securely fit through hole 18 and into rotor 16.

Figure 5:
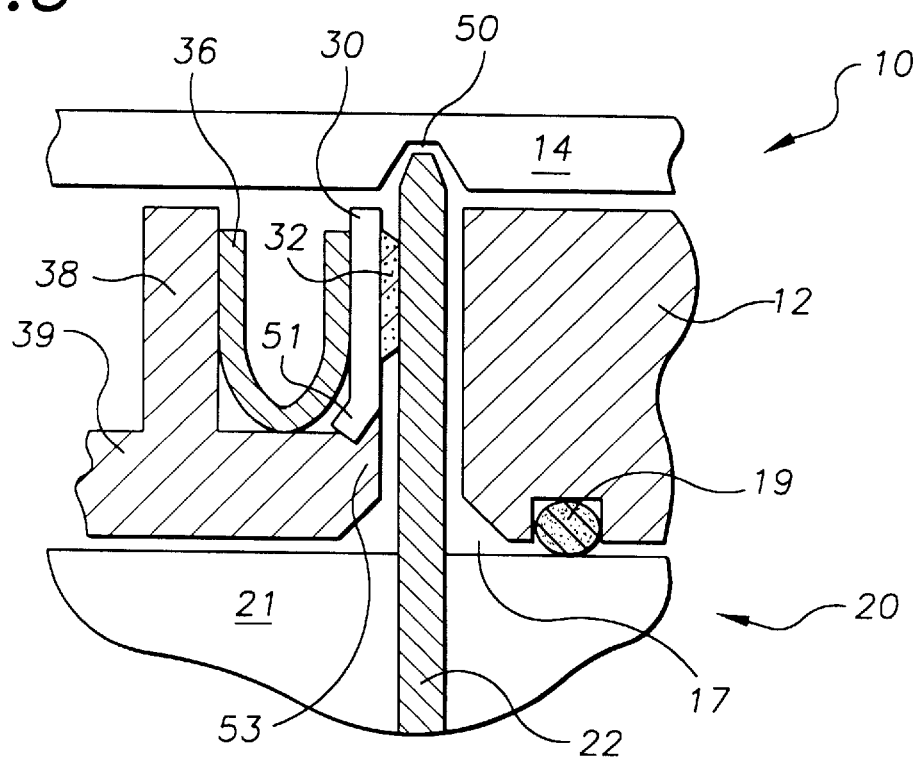
FIG. 5 is a cross sectional view of FIG. 2.

Referring to FIG. 5, there is an enlarged sectional view of the sensor unit 10 mounted to the connector unit 20. In particular, there is a pin 22 alignment cavity 50, a bent film section 51, and film bending and positioning tab 53.

Figure 6:
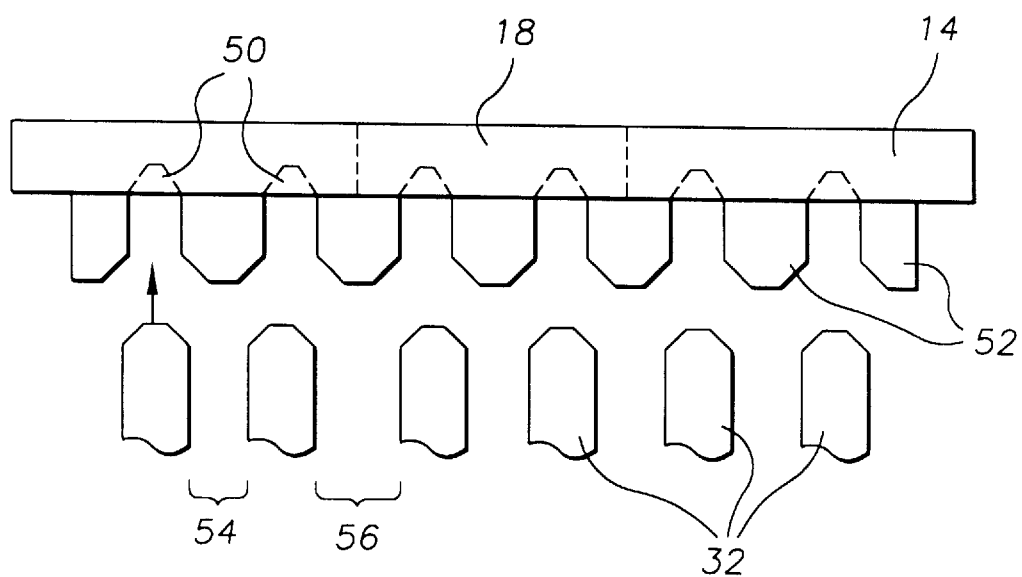
FIG. 6 is a cross sectional view the connector pin self alignment means.

Referring to FIG. 6, there is an enlarged sectional view of the pins 32 being self aligned to cover 14. Uniquely, as illustrated, the same sensor unit 10 may unfortunately have some pins 32 that have closer spacing 54 and some pins 32 that have larger spacing 56. This mismatched spacing will encounter alignment tabs 52 and be directed into alignment cavities 50. Additionally, as illustrated in FIG. 3, the pin holes 17 are also chamfered to direct misaligned pins 32.

Remarks About the Preferred Embodiment

One of ordinary skill in the art of designing and using position sensors will realize many advantages from studying and using the preferred embodiment. For example, the sensor unit can be made independent of the connector unit 20, thus, making the sensor unit a less expensive part than previous sensor devices that included connector features.

A skilled artisan will understand how and why alignment tab 25 fits to alignment grove 15 and how snap tab 13 fits to snap coupling 23. Additionally, it is well understood that hole 18 could snugly fit around the portion of rotor 16 that extends up into hole 18. One skilled in the art would also know that seal 19 is used to prevent the external contamination, like dust or moisture, from entering pin holes 17.

It is noted that pin alignment tabs 52 and cavities 50 are used to force pins 22 into proper alignment and onto output pads 32. This is useful when pins 22 are bent into positions that create smaller 54 and larger 56 spacing therebetween. Of course, an artisan realizes that film bending tab 53 will create the film bent portion 51 for preventing pins 22 from becoming inserted on a wrong side of film 30.

One skilled in the art would know that the connector shroud 26 is used for both mechanically and electrically coupling to external electrical wires (not shown). The electrical wires are used for directing power to the sensor, and for directing position sensor signals to appropriate devices. Of course, the shroud encloses either female or male electrical contacts for coupling to the external wires.

Variations of the Preferred Embodiment

Although the illustrated embodiments discuss the arrangement of a sensor using connector unit, one skilled in the art will realize that the preferred embodiment would work with most any device that provides male electrical leads 22 to fit into the sensor unit 10. For example, it is contemplated to place the sensor unit 10 over a shaft used by a gas pedal (not shown). Specifically, the gas pedal would be designed to have male pins integrally formed thereon to fit into the pin holes 17 when mounting the shaft. Of course the hole 18 would need to be located on the same side as the pin holes 17 for the rotor 16 to simultaneously fit over a shaft.

An additional variation of the invention contemplates the use of applying any type base material 30 to support the resistive elements and/or traces 34, for example any suitable metal, Kapton material, polyamide material, plastic etc.

Although the preferred embodiment depicts a certain shaped film 30, many variations are possible. For example, all of the outputs could be at one end of the material 30, and the slit separating the two ends could be positioned in another location. Additionally, it is even contemplated to place the resistive element and/or traces 34 in different locations, like on the bottom side of the cover 14 or the top surface of base wall 39. Of course this would require a different shaped rotor 16 and other elements.

Even though the preferred embodiment describes placing the pressure wedge 36 next to the pressure wall 38, it is contemplated to reverse the wedge and pin 22 locations. Of course the film 30 and pin holes 17 would have to be equally relocated appropriately.

Although connector 20 illustrates a circumferential housing wall 28, there are many possible design variations. It is contemplated to not use any wall at all and just have snap couplings 23 sticking up, for example. Even the round shape of the sensor unit and associated connector can be changed to most any shape like oval, square, etc. Additionally, all parts on the connector 20 not needed for electrical connection could be eliminated. It this case, pins 22 would securely fit into sensor unit 10, and shroud 26 would be left intact to connect to external electrical wiring. To achieve the secure mating of the sensor and connector unit, pins 22 would have securing means, like a snap in or pressure fit pin design.

The preferred embodiment describes the use of tabs 13 and alignment groves 15 for coupling the sensor units 10 to connector 20. However, any known means of connecting two parts together would function, like gluing, threading, pinning, buckling, etc. Additionally, it is expected that the exact placement of the attachment means is not critical. For example, the tabs 13 could extend off the bottom side of the sensor unit and fit into locking holes placed in the support surface 21 on connector 20.

There is illustrated a seal 19 located around the periphery of the entire sensor unit 10. However, it is contemplated to have only the pin hole 17 areas circumscribed by a seal 19. Additionally, other materials could be used for the material of seal 17 like epoxy, glue, resins, O-rings, or any resilient material.

Even though the preferred embodiment shows a pressure wall 38, artisans could use most any structure that would support pressure to be applied to pressure devices 36, which can also be most any shape and still force film 30 against pin 22.

It is illustrated to have film 30 pressed against pins 22 by pressure device 36. However, it is equally contemplated to have other arrangements that would still provide electrical contact between the output pads 32 and pins 22. For example, pressure element 36 could serve as electrical connection between the pins and flexible film 30. Of course a skilled artisan realizes that film 30 has to be placed next to pressure wall 38 to allow a metal pressure element 36 to directly contact pins 22. Additionally, a skilled artisan would also know that the pressure element 36 would have to be divided into single identical pieces to provide proper electrical connection.

Although shroud 26 is illustrated as being oriented in a certain direction and having a certain shape, it is contemplated to design it in any known configuration and angle to the pins 22.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the description. All changes that come within the meaning and range of equivalency of the claims are to be embraced within their scope.

What is claimed and desired to be secured by United States patent is:

1. A position sensor, comprising:
   a) a sensor unit, including:
      a1) a sensor housing having:
         i) a top side having a hole located therein,
         ii) a bottom side having: 1) a pressure wall, located thereon and within the housing, and having a first and second side, 2) a plurality of pin holes adjacent the first side and extending through the bottom side, 3) a film tab, located thereon next to the plurality of pin holes and the pressure wall; and
         iii) a housing wall positioned between the top and bottom sides;
      a2) a flexible film having output pads located thereon, and positioned within the sensor housing so that 1) one edge of the film fits into the film tab so that the pads are located between the first side and the pin holes, and 2) a remainder of the flexible film is positioned adjacent the housing wall and located on the second side;
      a3) a rotor, positioned to extend into and be exposed through the hole, having a contactor for contacting the flexible film located there around;
      a4) a pressure element, positioned between the first side and the flexible film, for pressing the flexible film away from the first side and against any electrical pins inserted into the plurality of pin holes; and
      a5) wherein, the sensor housing substantially encloses the flexible film, the rotor and the pressure element therein;
   b) a connector unit, surrounding the sensor unit including:
      b1) a connector housing, having a bottom wall and side wall; and
      b2) a plurality of electrical pins, extending from the bottom wall; and
   c) a coupling device so constructed and located on both the sensor and connector units so that 1) the connector housing side wall surrounds the sensor unit housing wall, 2) the plurality of electrical pins fits into the plurality of pin holes, and 3) the output pads are matched to and pressed against the plurality of electrical pins.

2. The position sensor of claim 1, wherein the base film includes resistance elements and traces that are electrically connected to the pads.

3. The position sensor of claim 2, wherein the sensor unit further includes:
   a spring, coupled around the rotor, for rotating the rotor back to a starting position; and
   an electrical connecter wiper blade located on the rotor, for electrically connecting the resistance elements and traces on the base element.

4. The position sensor of claim 3, wherein the coupling device further includes:
   an alignment notch, located on the sensor unit housing wall, for aligning the sensor unit with the connector unit; and
   a snap tab, located on the sensor unit housing wall, for releasably holding the sensor unit to the connector unit.

5. The position sensor of claim 4, wherein the coupling device further includes:
   a snap tab coupling, located on the connector unit side wall, for releasably coupling to the snap tab on the sensor unit, and
   an alignment tab, located on the connector unit side wall, for being positioned into the alignment notch on the sensor unit and thus allowing the snap tab and snap tab coupling to releasably couple together.

6. The position sensor of claim 5, wherein the electrical connector further includes an electrical connector shroud, coupled thereto, for both mechanically and electrically coupling to external electrical wires.

7. The position sensor of claim 6, wherein sensor unit includes:
   a pin alignment device that is positioned and dimensioned so that the plurality of electrical pins will be bent to match up with associated pads; and
   a seal, located on a side containing the plurality of pin holes, located and designed so that external environmental contaminants will not enter through the plurality of pin holes and enter into the sensor unit.

8. A position sensor, comprising:
   a) a sensor unit, having:
      a1) a sensor housing; and
      a2) a signal generating means substantially enclosed in the sensor housing, for enabling the sensor unit to generate signals representative of a position of an attached device, and output pads, designed so that the signals are received thereon; and b) a connector unit, having
   b1) a connector housing surrounding and connecting to the sensor housing, and
   b2) a plurality of pins, mechanically coupled to the connector housing, sized and positioned so that one end of the pins are mechanically and electrically coupled to the output pads and a second end of the pins can be electrically coupled to an external wire.

9. The position sensor of claim 8, further comprising:
coupling means, located on both the sensor and connector units, for releasably coupling the connector unit to the sensor unit so that the plurality of electrical pins fit onto the output pads.

10. The position sensor of claim 8, wherein the appropriate electrical and mechanical components include having:
   a) a flexible film, located on an inside surface of the sensor housing;
   b) a hole located on a top side of the sensor housing;
   c) a rotor, positioned to be exposed through the hole, having a contactor for contacting the flexible film that is positioned around the rotor for generating the signals; and
   d) a pressure element, positioned next to the flexible film, for pressing the output pads on flexible film against the plurality of pins.

11. The position sensor of claim 10, wherein the coupling means includes:
   an alignment notch, located on the sensor housing, for aligning the sensor unit with the connector unit; and
   a snap tab, located on the sensor unit, and a snap tab coupling, located on the connector unit, the snap tab sized and dimensioned for releasably coupling to the snap tab coupling.

12. The position sensor of claim 11, wherein the electrical connector further includes an electrical connector shroud, coupled thereto, for both mechanically and electrically coupling the connector unit pins to the external wire.

13. The position sensor of claim 12, wherein the connector unit is part of a vehicle gas pedal.

14. The position sensor of claim 13, wherein sensor unit includes:
   a pin alignment device that is positioned and dimensioned so that the plurality of pins will be bent to match up with associated pads; and
   a seal, located on the sensor unit, designed so that external environmental contaminants will not enter into the sensor unit around the output pads.

15. A position sensor, comprising:
   a) a housing;
   b) sensor means, positioned and substantially enclosed in the housing, for generating an electrical signal representative of a position of a device coupled to the position sensor;
   c) a plurality of output pads, located within the sensor housing and electrically coupled to the sensor means, designed so that the electrical signals can be received and thereby routed to an electrical connector; and
   d) a plurality of holes, located in one side of the housing, aligned so that pins from an electrical connector can receive the electrical signals from the plurality of output pads therein.

16. A position sensor for determining a position of a shaft, comprising:
   a) a signal generator means that is substantially enclosed and having a signal output pad on a substrate, for generating a signal representative of the position; and
   b) attachment means, disposed in surrounding engagement with the signal generator and, integral to the position sensor, for coupling a separate external connector directly to the output pad.

17. The position sensor of claim 16, further comprising a sensor housing having:
   a1) a top side having a hole located therein;
   a2) a bottom side having a plurality of pin holes therethrough;
   a3) a housing wall positioned to support and separate the top and bottom sides; and
   a4) a flexible film tab, positioned on the bottom side.

18. The position sensor of claim 17, wherein the signal generator means further including:
   a) a pressure wall, located within the sensor housing, and having a first and second side,
   b) the substrate is a flexible film tab, having a first portion located next to the plurality of pin holes and the pressure wall; having:
      i) one edge of the flexible film fit into the flexible film tab so that coupling of the external connector will contact the output pads near the plurality of pin holes; and
      ii) a second portion of the flexible film is positioned adjacent the housing wall and located on the second side of the pressure wall; and
   c) the signal generator including a rotor, positioned to extend into and be exposed through the hole, having a contactor for contacting the flexible film located there around.

19. The position sensor of claim 16, wherein the attachment means further comprising:
   an alignment notch, located on the signal generator means, for aligning the signal generator means with a connector unit; and
   a snap tab, located on the signal generator means, the snap tab sized and dimensioned for releasably coupling to a snap tab coupling located on an associated electrical coupling.

20. The position sensor of claim 19, wherein the signal generator means further comprising:
   a) the substrate being a flexible film;
   b) a hole located on a top side of the signal generator means;
   c) a rotor, positioned to be exposed through the hole, having a contactor for contacting the flexible film that is positioned around the rotor for generating the signals; and
   d) a pressure element, positioned next to the flexible film, for pressing the output pads on the flexible film against the external connector.

21. The position sensor of claim 20, wherein the external connector is integral with a vehicle gas pedal.

22. The position sensor of claim 21, wherein signal generator means further includes:
   a pin alignment device that is positioned andimensioneded so that a plurality of pins from an external connector will be bent into position to match up with associated pads; and
   a seal, designed so that external environmental contaminants will not enter into the signal generator means from around the output pads and external connector attachment area.

* * * * *